United States Patent
Vitoorapakorn

(10) Patent No.: US 11,156,322 B2
(45) Date of Patent: Oct. 26, 2021

(54) PIPE INSULATION JACKET WITH REINFORCEMENT MEMBER

(71) Applicant: Aeroflex USA, Inc., Sweetwater, TN (US)

(72) Inventor: Pawat Vitoorapakorn, Samut Prakan (TH)

(73) Assignee: Aeroflex USA, Inc., Sweetwater, TN (US)

( * ) Notice: Subject to any disclaimer, the term of this patent is extended or adjusted under 35 U.S.C. 154(b) by 0 days.

(21) Appl. No.: 16/666,905

(22) Filed: Oct. 29, 2019

(65) Prior Publication Data

US 2021/0123557 A1    Apr. 29, 2021

(51) Int. Cl.
*F16L 9/14* (2006.01)
*F16L 59/02* (2006.01)

(52) U.S. Cl.
CPC .................... *F16L 59/024* (2013.01)

(58) Field of Classification Search
CPC .................................................. F16L 59/024
USPC .................... 138/149, 112, 158, 170
See application file for complete search history.

(56) References Cited

U.S. PATENT DOCUMENTS

| 312,037 A | 2/1885 | Suhur | |
|---|---|---|---|
| 527,867 A | 10/1894 | Manville | |
| 1,613,725 A | * 1/1927 | Sabin | F16L 59/023 |
| | | | 138/148 |
| 3,485,272 A | * 12/1969 | Schmidt | F16L 9/04 |
| | | | 138/112 |
| 3,614,967 A | 10/1971 | Royston | |
| RE28,930 E | * 8/1976 | Johnson | F16L 59/024 |
| | | | 138/158 |
| 4,022,248 A | 5/1977 | Hepner et al. | |
| 4,054,711 A | * 10/1977 | Botsolas | B29C 70/00 |
| | | | 442/31 |
| 4,103,320 A | * 7/1978 | de Putter | F16L 9/00 |
| | | | 138/103 |
| 4,213,487 A | 7/1980 | Funk et al. | |
| 4,243,453 A | 1/1981 | McClintock | |

(Continued)

FOREIGN PATENT DOCUMENTS

EP    1138996    10/2001
JP    S5383151 A    7/1978

*Primary Examiner* — James F Hook
(74) *Attorney, Agent, or Firm* — Pitts & Lake, P.C.

(57) ABSTRACT

A reinforced insulation jacket for a pipe includes a first jacket member and a second jacket member, each jacket member including a dimensionally stable, thermally insulating material having the shape of a semi hollow cylinder. Both the first jacket member and second jacket member have substantially identical cross sectional shape and are adapted to be joined to form a hollow cylinder, thereby enclosing the pipe to be insulated. A reinforcement member is located within the dimensionally stable, thermally insulating material body of at least one of the jacket members. This reinforcement member generally comprises a rod component and two end cap pieces. The end cap pieces generally are plastic, and rod component, in various embodiments, generally includes iron, steel, or a hard plastic, and generally is a rigid rod. The reinforcement member provides additional stiffness to the dimensionally stable, thermally insulating material body of the jacket member.

17 Claims, 2 Drawing Sheets

(56) References Cited

U.S. PATENT DOCUMENTS

Figure 1:
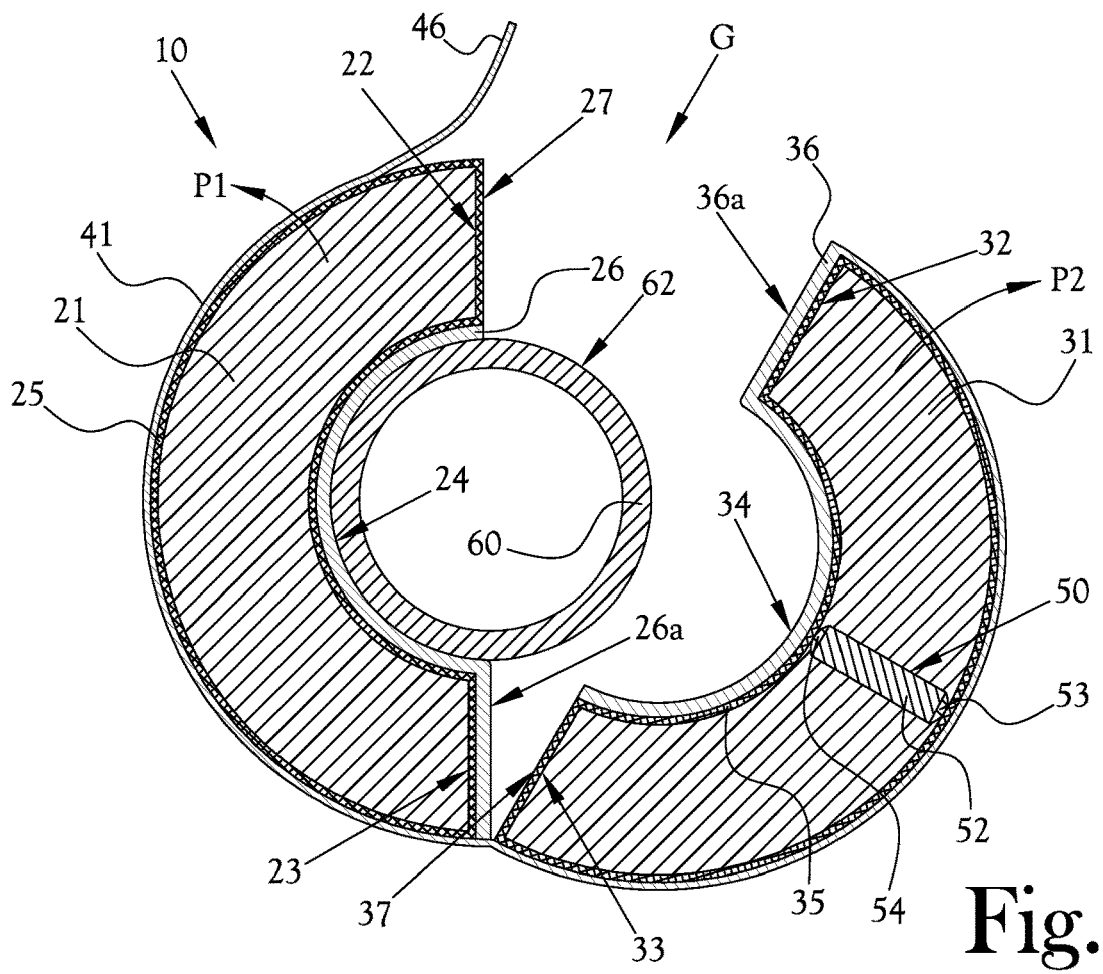

| | | | |
|---|---|---|---|
| 4,287,245 A * | 9/1981 | Kikuchi | F16L 59/024 138/141 |
| 4,307,756 A * | 12/1981 | Voigt | F16L 59/04 138/149 |
| 4,772,507 A | 9/1988 | Leo, Jr. et al. | |
| 5,006,185 A | 4/1991 | Anthony et al. | |
| 5,123,453 A | 6/1992 | Robbins | |
| 5,437,312 A * | 8/1995 | Gumangan | F16L 59/12 138/147 |
| 5,690,147 A | 11/1997 | Cridland et al. | |
| 5,727,599 A | 3/1998 | Fisher et al. | |
| 5,934,337 A | 10/1999 | Fiala et al. | |
| RE37,279 E | 7/2001 | Fisher et al. | |
| 6,403,180 B1 * | 6/2002 | Barrall | B32B 1/08 428/36.5 |
| 6,460,576 B2 | 10/2002 | Vitoorapakorn | |
| 2002/0092577 A1 | 7/2002 | Vitoorapakorn | |
| 2007/0292647 A1 * | 12/2007 | Princell | B29C 66/496 428/36.9 |
| 2016/0245451 A1 * | 8/2016 | Okada | C08G 18/4208 |

\* cited by examiner

PIPE INSULATION JACKET WITH REINFORCEMENT MEMBER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

The present invention pertains generally to pipe insulation jackets and, more particularly, to a pipe insulation jacket with two jacket members that can be joined to form a hollow cylinder.

2. Description of the Related Art

Suspending or supporting thermally insulated pipes presents problems due to the fact that conventional insulators are not sufficiently strong for the brackets, by which the pipes are to be suspended or supported, to be attached to them. Therefore, pipe brackets are generally fixed directly to the pipe. This in turn requires additional insulation for the pipe brackets to prevent the formation of undesirable cold or heat bridges. It is obvious that providing additional insulation for pipe brackets is quite expensive.

U.S. Pat. No. 6,460,576 discloses a pipe insulation jacket comprising two jacket members that can be joined to form a hollow cylinder. Both jacket members are made of a dimensionally stable, thermally insulating material. Both jacket members are provided with an elastic coating layer extending over the inner surface and over one of the radially extending end faces of the jacket members. The outer surfaces of the two jacket members are covered by a common tape linking the jacket members at one side in such a way that they can be spread apart at the other to such an extent that the insulation jacket can be radially moved onto the pipe to be insulated. The tape extends over the jacket member at the side where the two jacket members are spread apart, and its inner side is provided with an adhesive layer to interconnect the two jacket members once the pipe is enclosed.

A need is felt for an insulation jacket that provides additional stiffness to the thermally insulating material body of the jacket, helping to protect the integrity and durability of the insulation jacket and also thereby indirectly helping to protect the integrity of the pipe around which the insulation jacket is installed.

SUMMARY OF THE INVENTION

Disclosed herein are various example embodiments of the present general inventive concept. Generally, a reinforced insulation jacket for a pipe includes a first jacket member and a second jacket member, each jacket member including a dimensionally stable, thermally insulating material having the shape of a semi hollow cylinder with a first radially extending end face, a second radially extending end face, an inner surface area and an outer surface area. Both the first jacket member and second jacket member have substantially identical cross sectional shape and are adapted to be joined to form a hollow cylinder, thereby enclosing the pipe to be insulated. A reinforcement member is located within the dimensionally stable, thermally insulating material body of at least one of the jacket members. This reinforcement member generally comprises a rod component and two end cap pieces. The end cap pieces generally are plastic, and rod component, in various embodiments, generally includes iron, steel, or a hard plastic, and generally is a rigid rod. The reinforcement member generally is positioned such that the longitudinal axis of the rod component extends from a point proximate the inner surface of the jacket member to a point proximate the outer surface of the jacket member, with one end cap piece being nearer the outer surface area of the jacket member than the inner surface area of the jacket member, and with the second end cap piece being nearer the inner surface area of the jacket member than the outer surface area of the jacket member. The reinforcement member provides additional stiffness to the dimensionally stable, thermally insulating material body of the jacket member, helping to protect the integrity and durability of the insulation jacket. By reinforcing and strengthening the insulation jacket, the reinforcement member also thereby indirectly helps to protect the integrity of the pipe around which the insulation jacket is installed.

Thus, in some example embodiments of the present general inventive concept, a reinforced insulation jacket for a pipe includes a first jacket member including a dimensionally stable, thermally insulating material having the shape of a semi hollow cylinder with a first radially extending end face, a second radially extending end face, an inner surface area and an outer surface area; a second jacket member including a dimensionally stable, thermally insulating material having the shape of a semi hollow cylinder with a first radially extending end face, a second radially extending end face, an inner surface area and an outer surface area; both said first and second jacket member having substantially identical cross sectional shape and adapted to be joined to form a hollow cylinder thereby enclosing a pipe to be insulated, whereby said first end face of said first jacket member faces said first end face of said second jacket member, and whereby said second end face of said first jacket member faces said second end face of said second jacket member; a reinforcement member positioned within dimensionally stable, thermally insulating material of at least one of said first jacket member and said second jacket member, said reinforcement member including a rigid rod component and two end cap pieces; said inner surface area of said first jacket member and said inner surface area of said second jacket member being provided with an elastic coating layer, said elastic coating on said inner surfaces of said first and second jacket member engaging the pipe to be insulated; at least one of said first end face of said first jacket member and said first end face of said second jacket member, and at least one of said second end face of said first jacket member and said second end face of said second jacket member being provided with an elastic coating layer; and a tape member common to said first and second jacket member and covering both said outer surface area of said first jacket member and said outer surface area of said second jacket member, said tape member linking said first and second jacket member together at the side of said second end faces of said first and second jacket member such that they can be spread apart from each other at the side of said first end faces of said first and second jacket member to such an extent that the reinforced insulation jacket for a pipe can be radially moved onto the pipe to be insulated.

FIGURES

The above-mentioned and additional features of the invention will become more clearly understood from the following detailed description of the invention read together with the drawings. In the accompanying drawings and illustrations, the sizes and relative sizes, shapes, and qualities of lines, entities, and regions may be exaggerated for clarity. The components in the figures are not necessarily to scale, emphasis instead being placed upon illustrating the principles of the general inventive concept.

Figure 2:
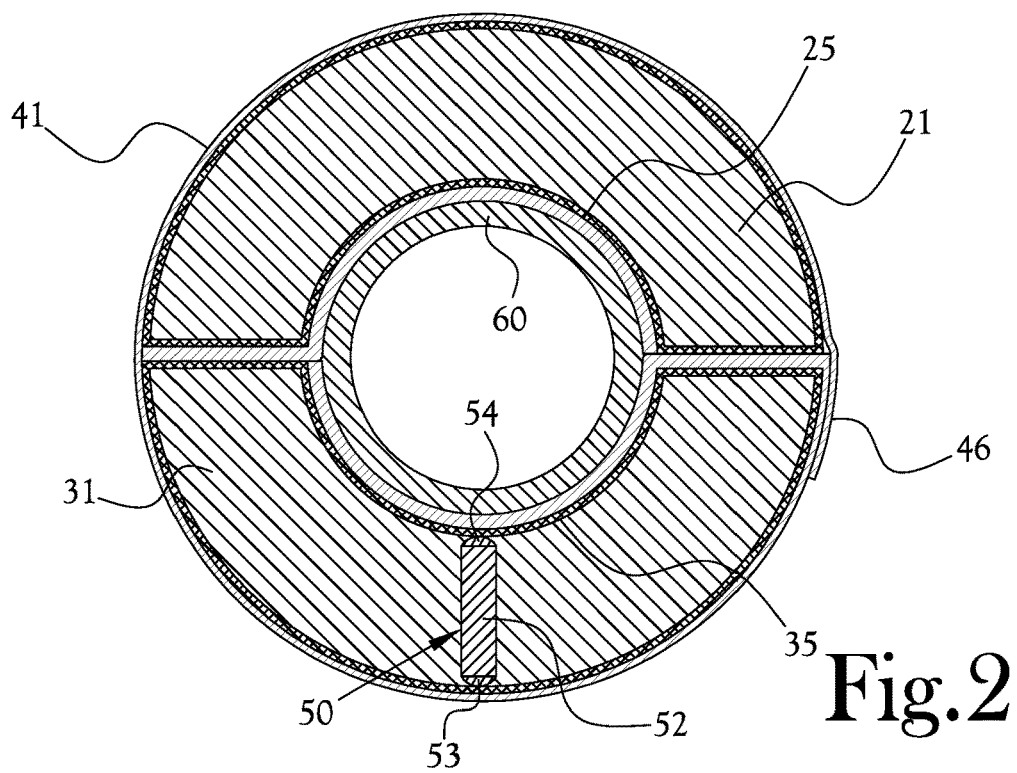
Figure 3:
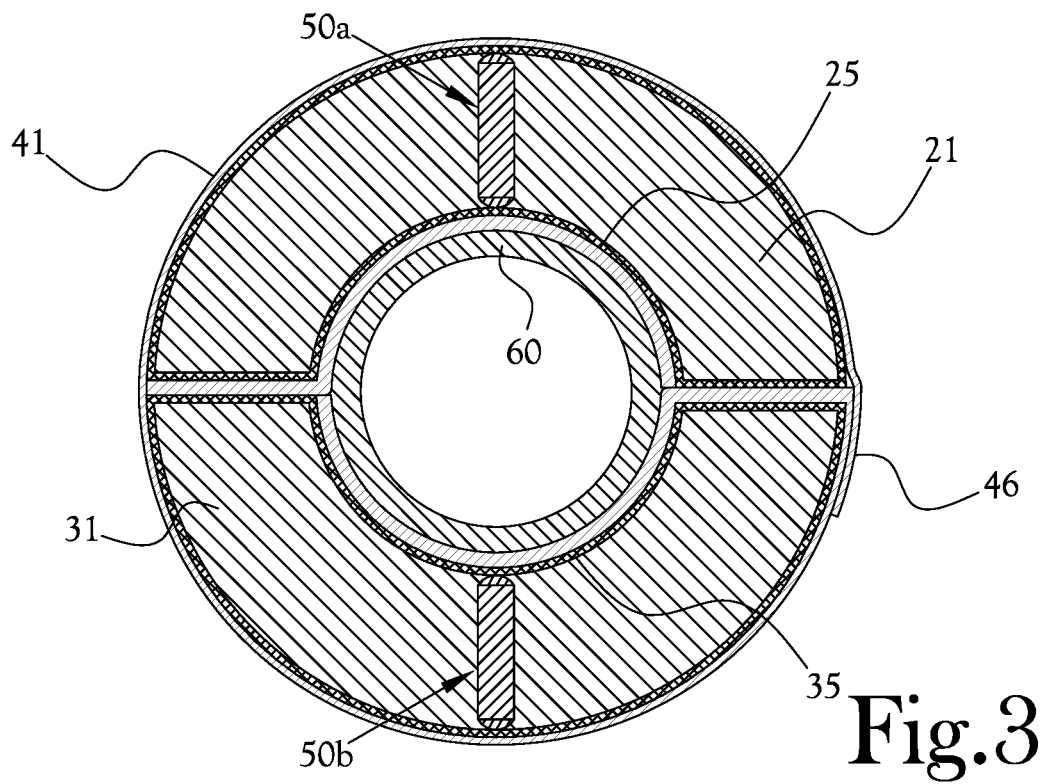

FIG. 1 is a section view of an insulation jacket with reinforcement member according to one example embodiment of the present general inventive concept, showing layers of different materials as described in greater detail below, showing the insulation jacket in a configuration or condition, with the corresponding end faces of the jacket members not yet brought together;

FIG. 2 is a second section view of the example embodiment insulation jacket with reinforcement member shown in FIG. 1, showing the insulation jacket in a second or closed configuration or condition, with the corresponding end faces of the jacket members brought together to fully enclose the pipe in accordance with the present general inventive concept; and FIG. 3 is a section view of a reinforced insulation jacket according to a further example embodiment of the present general inventive concept, showing an insulation jacket with two reinforcement members, one in each jacket member.

DETAILED DESCRIPTION

Turning to the Figures, FIG. 1 shows a cross sectional view of the insulation jacket e.g. for thermally insulating a pipe. As seen in FIG. 1, the insulation jacket 10 comprises a first jacket member 21 of hollow cylindrical configuration and a second jacket member 31 of hollow cylindrical configuration. The first and second jacket members 21, 31 are of dissymmetrically identical shape and are manufactured of a dimensionally stable, thermally insulating material, for example of a rigid foamed polyurethane material. In some embodiments, the outer surface of the jacket members 21, 31 is provided with a separate, smooth coating layer or an integral surface layer of smooth, not foamed polyurethane material.

A latex coating layer 25, 35 covers the surface areas of the jacket members 21, 31. In some embodiments, this latex coating layer 25, 35 generally includes some form of latex, in some embodiments mixed with other materials. The inner surface areas 24, 34 of the jacket members 21, 31 facing the outer surface 62 of the pipe 60 are provided in each case with an elastic coating layer 26, 36 overlaying the latex coating layer 25 and having vibration damping properties and being elastic in the direction of compression thereof. The elastic coating layers 26, 36 extend not only over the inner surface areas 24, 34 of the jacket members 21, 31 facing the outer surface 62 of the pipe 60, but also over the lower or second end face 23 of the first jacket member 21 as well as over the upper or first end face 32 of the second jacket member 31. These areas of the elastic coating layers 26, 36 covering the end faces 23, 32 are designated with reference numerals 26a and 36a, respectively. The first end face 22 of the first jacket member 21 and the second end face 33 of the second jacket member 31 are each covered with a self-adhesive layer 27 and 37, respectively; generally, both self-adhesive layers 27, 37 are covered by a removable protection foil to be removed during the process of applying the insulation jacket 10 to a pipe.

A reinforcement member 50 is located within the dimensionally stable, thermally insulating material body of at least one of the jacket members—in the illustrated example embodiment in FIG. 1, in the second jacket member 31. This reinforcement member 50 generally comprises a rod component 52 and two end cap pieces 53, 54. The end cap pieces 53, 54 generally are plastic, and rod component 52, in various embodiments, generally includes iron, steel, or a hard plastic, and generally is a rigid rod. The reinforcement member 50 generally is positioned such that the longitudinal axis of the rod component 52 extends from a point proximate the inner surface of the jacket member 31 to a point proximate the outer surface of the jacket member 31, with one end cap piece 53 being nearer the outer surface area of the jacket member 31 than the inner surface area 34 of the jacket member 31, and with the second end cap piece 54 being nearer the inner surface area 34 of the jacket member 31 than the outer surface area of the jacket member 31. The reinforcement member 50 provides additional stiffness to the dimensionally stable, thermally insulating material body of the jacket member 31, helping to protect the integrity and durability of the insulation jacket 10. By reinforcing and strengthening the insulation jacket 10, the reinforcement member 50 also thereby indirectly helps to protect the integrity of the pipe 60 around which the insulation jacket 10 is installed.

The outside of the two jacket members 21, 31 are provided with a shared tape member 41 resistant against tensile forces, but elastically bendable. As can be seen in FIG. 1, the tape member 41 encloses the two jacket members 21, 31 forming the insulating jacket 10 such that the jacket members are linked together (in the present illustrated example at the bottom), but can be spread apart at the opposite end (in the present example at the top), in the direction of the arrows P1 and P2, at least to such an extent that a gap G opens enabling the insulating jacket 10 to be radially pushed over the pipe 60 to be insulated. The tape member 41 comprises a tongue portion 46 that extends over a few centimeters beyond the first end face 22 of the first jacket member 21 and over the gap G between the two jacket members 21, 31. The inner surface of the tongue 16 is provided with a self-adhesive layer covered by a removable protection foil 17.

Generally, when the insulating jacket 10 is being applied to a pipe, the protection foils covering the self-adhesive layers 27, 37 are removed prior to applying the insulating jacket to the pipe 60, with the result that the two jacket members 21, 31 can be united by bonding them together at their end faces 22, 32 and 23, 33, respectively, to form a closed hollow cylindrical insulation jacket once they are in place over the pipe 60. Thereafter, protection foil covering the self-adhesive surface of the tongue portion 46 is removed, and the tongue portion 46 is fixed to the outside of the right jacket member 31. Thus, the tongue portion 46 of the tape member 41 extends over the now closed gap and acts as a steam and humidity barrier. This situation is shown in FIG. 2.

Generally, both the tape member 41 as well as the elastic coating layers 26, 36 are made of a cellular synthetic caoutchouc having non-hygroscopic characteristic. As a material for manufacturing both the outer elastic coating layers 26, 36 as well as the tape member 41, besides synthetic caoutchouc, also thermoplastic materials are suitable; fundamentally, both organic and inorganic materials can be used.

For supporting or suspending a pipe provided with such an insulation jacket, usually metallic pipe straps or brackets are used (not shown in the drawings), enclosing the outer surface of the insulation jacket. By providing the tape member 41 and by providing the outer elastic coating layers 26, 36, it is ensured that the pipe bracket is well insulated from the pipe 60 as far as vibrations are concerned. Thus, no vibrations can be transferred neither from the pipe 60 to the pipe bracket, nor vice versa.

Since both jacket members 21, 31 are made of a dimensionally stable material, they are not deformed or compressed by the application of pipe brackets. Only the portions 26*a*, 36*a* of the outer elastic coating layers 26, 36 provided at the end faces 23, 32 of the jacket members 21 and 31 are compressed under the influence of the clamping force exerted by a pipe bracket. However, such compression is welcome since the end faces 22, 23 and 32, 33, respectively, are holohedrally contacting each other and thereby provide a good protection from moisture penetrating into the interior of the insulation jacket. The lateral end faces of the jacket members 21, 31 are generally sealed to prevent moisture from penetrating into the jacket material and to provide a smooth surface easing the application of glue to connect the insulation jacket with an adjoining one.

The embodiment of the reinforced insulation jacket according to the present general inventive concept and described herein before can be applied to a pipe very quickly and easily. Besides being a rigid support base for the pipe and besides its easy handling, the insulation jacket according to the invention provides the advantage of having vibration-damping characteristics. Moreover, it is able to compensate for certain inevitable tolerances of the outer diameter of the pipe to be insulated, and the penetration and escape, respectively, of steam and moisture is effectively avoided. Finally, the congruent design of the two jacket members 21, 31 favors an affordable manufacturing of the insulation jacket.

It is understood that the embodiment shown in the drawings and described herein before is not meant to limit the scope of the present invention. For example, the reinforcement member 50 could be located within the body of the first jacket member 21 rather than within the body of the second jacket member 31. Further, in various embodiments, a reinforced insulation jacket might include multiple reinforcement members. In some embodiments, both the first jacket member 21 and the second jacket member 31 include a reinforcement member. This is the case in the example embodiment shown in FIG. 3, where the first jacket member 21 includes a first reinforcement member 50*a* and the second jacket member includes a second reinforcement member 50*b*. A reinforced insulation jacket with two or more reinforcement members is useful in certain situations that call for more reinforcement than would be provided by an embodiment with only one reinforcement member—such situations as, for example, installation of a reinforced insulation jacket on a riser pipe supporter.

Moreover, other embodiments could be characterized by, for example, the fact that the elastic coating layers 26, 36 extend over both end faces 22, 23 and 32, 33, respectively. In still another example embodiment, only one of the two jacket members 21, 31 could be provided with the aforementioned elastic coating layer; in that case, the elastic coating layer would extend over the inner surface area 34 and over both end faces 32, 33 of one of the jacket members 31, while it would extend just over the inner surface area 24 and not over the end faces 22, 23 of the other first jacket member 21. It is important, however, that at least one of two end faces 22, 32 and 23, 33 located opposite to each other is provided with an elastic coating layer 26*a*, 36*a*, due to the above-mentioned compression properties of the elastic coating layer.

Thus, various example embodiments of the present general inventive concept provide a reinforced insulation jacket for a pipe comprising a first jacket member including a dimensionally stable, thermally insulating material having the shape of a semi hollow cylinder with a first radially extending end face, a second radially extending end face, an inner surface area and an outer surface area; a second jacket member including a dimensionally stable, thermally insulating material having the shape of a semi hollow cylinder with a first radially extending end face, a second radially extending end face, an inner surface area and an outer surface area; both said first and second jacket member having substantially identical cross sectional shape and adapted to be joined to form a hollow cylinder thereby enclosing a pipe to be insulated, whereby said first end face of said first jacket member faces said first end face of said second jacket member, and whereby said second end face of said first jacket member faces said second end face of said second jacket member; a reinforcement member positioned within dimensionally stable, thermally insulating material of at least one of said first jacket member and said second jacket member, said reinforcement member including a rigid rod component and two end cap pieces; said inner surface area of said first jacket member and said inner surface area of said second jacket member being provided with an elastic coating layer, said elastic coating on said inner surfaces of said first and second jacket member engaging the pipe to be insulated; at least one of said first end face of said first jacket member and said first end face of said second jacket member, and at least one of said second end face of said first jacket member and said second end face of said second jacket member being provided with an elastic coating layer; and a tape member common to said first and second jacket member and covering both said outer surface area of said first jacket member and said outer surface area of said second jacket member, said tape member linking said first and second jacket member together at the side of said second end faces of said first and second jacket member such that they can be spread apart from each other at the side of said first end faces of said first and second jacket member to such an extent that the reinforced insulation jacket for a pipe can be radially moved onto the pipe to be insulated.

In some embodiments, said first jacket member and second jacket member are made of a hard foam polyurethane material.

Some embodiments further include a latex coating layer coating said first jacket member and said second jacket member, latex coating layer being between said dimensionally stable, thermally insulating material and said elastic coating layer.

In some embodiments, said rigid rod component of said reinforcement member comprises a plastic.

In some embodiments, said rigid rod component of said reinforcement member comprises a hard plastic.

In some embodiments, said rigid rod component of said reinforcement member comprises steel. In some embodiments, said rigid rod component of said reinforcement member comprises iron or some other metal.

In some embodiments, said end cap pieces of said reinforcement member comprise plastic.

In some embodiments, said tape member comprises a tongue portion extending over the edge between said outer surface area and said first end face of said first or second jacket member, the surface of said tongue portion facing said outer surface area of said first or second jacket member being provided with a self-adhesive layer.

In some embodiments, said tape member comprises a closed cellular structure.

In some embodiments, said elastic coating layer comprises a closed cellular structure.

In some embodiments, said elastic coating layer comprises vibration damping properties and has an elastic behavior when subjected to compression stress.

In some embodiments, said outer surface areas of said first jacket member and second jacket member covered by said tape member are provided with a smooth surface.

In some embodiments, said outer surface areas of said first jacket member and second jacket member covered by said tape member comprise a non-foamed surface layer.

In some embodiments, each of said first jacket member and said second jacket member includes a reinforcement member.

In some example embodiments of the present general inventive concept, a reinforced insulation jacket for a pipe comprises a first jacket member including a dimensionally stable, thermally insulating material having the shape of a semi hollow cylinder with a first radially extending end face, a second radially extending end face, an inner surface area and an outer surface area; a second jacket member including a dimensionally stable, thermally insulating material having the shape of a semi hollow cylinder with a first radially extending end face, a second radially extending end face, an inner surface area and an outer surface area; both said first and second jacket member having substantially identical cross sectional shape and adapted to be joined to form a hollow cylinder thereby enclosing a pipe to be insulated, whereby said first end face of said first jacket member faces said first end face of said second jacket member, and whereby said second end face of said first jacket member faces said second end face of said second jacket member; a reinforcement member positioned within dimensionally stable, thermally insulating material of at least one of said first jacket member and said second jacket member, said reinforcement member including a rod component and two end cap pieces, said rod component and said two end cap pieces including plastic; said inner surface area of said first jacket member and said inner surface area of said second jacket member being provided with an elastic coating layer, said elastic coating on said inner surfaces of said first and second jacket member engaging the pipe to be insulated; at least one of said first end face of said first jacket member and said first end face of said second jacket member, and at least one of said second end face of said first jacket member and said second end face of said second jacket member being provided with an elastic coating layer; and a tape member common to said first and second jacket member and covering both said outer surface area of said first jacket member and said outer surface area of said second jacket member, said tape member linking said first and second jacket member together at the side of said second end faces of said first and second jacket member such that they can be spread apart from each other at the side of said first end faces of said first and second jacket member to such an extent that the reinforced insulation jacket for a pipe can be radially moved onto the pipe to be insulated, said tape member including a tongue portion extending over the edge between said outer surface area and said first end face of said first or second jacket member, the surface of said tongue portion facing said outer surface area of said first or second jacket member being provided with a self-adhesive layer; said tape member and said elastic coating layer comprising a closed cellular structure.

In some embodiments, said first jacket member includes a reinforcement member and said second jacket member includes a reinforcement member.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:
1. A reinforced insulation jacket for a pipe, comprising:
a first jacket member including a dimensionally stable, thermally insulating material having the shape of a semi hollow cylinder with a first radially extending end face, a second radially extending end face, an inner surface area and an outer surface area;
a second jacket member including a dimensionally stable, thermally insulating material having the shape of a semi hollow cylinder with a first radially extending end face, a second radially extending end face, an inner surface area and an outer surface area;
both said first and second jacket member having substantially identical cross sectional shape and adapted to be joined to form a hollow cylinder thereby enclosing a pipe to be insulated, whereby said first end face of said first jacket member faces said first end face of said second jacket member, and whereby said second end face of said first jacket member faces said second end face of said second jacket member;
a reinforcement member positioned within dimensionally stable, thermally insulating material of at least one of said first jacket member and said second jacket member, said reinforcement member including a rigid rod component and two end cap pieces;
said inner surface area of said first jacket member and said inner surface area of said second jacket member being provided with an elastic coating layer, said elastic coating on said inner surfaces of said first and second jacket member engaging the pipe to be insulated;
at least one of said first end face of said first jacket member and said first end face of said second jacket member, and at least one of said second end face of said first jacket member and said second end face of said second jacket member being provided with an elastic coating layer; and
a tape member common to said first and second jacket member and covering both said outer surface area of said first jacket member and said outer surface area of said second jacket member, said tape member linking said first and second jacket member together at the side of said second end faces of said first and second jacket member such that they can be spread apart from each other at the side of said first end faces of said first and second jacket member to such an extent that the reinforced insulation jacket for a pipe can be radially moved onto the pipe to be insulated.

2. The reinforced insulation jacket for a pipe according to claim 1 in which said first jacket member and second jacket member are made of a hard foam polyurethane material.

3. The reinforced insulation jacket for a pipe according to claim 1 further comprising a latex coating layer coating said first jacket member and said second jacket member, said latex coating layer being between said dimensionally stable, thermally insulating material and said elastic coating layer.

4. The reinforced insulation jacket for a pipe according to claim 1 in which said rigid rod component of said reinforcement member comprises a plastic.

5. The reinforced insulation jacket for a pipe according to claim 4 in which said rigid rod component of said reinforcement member comprises a hard plastic.

6. The reinforced insulation jacket for a pipe according to claim 1 in which said rigid rod component of said reinforcement member comprises steel.

7. The reinforced insulation jacket for a pipe according to claim 1 in which said end cap pieces of said reinforcement member comprise plastic.

8. The reinforced insulation jacket for a pipe according to claim 1 in which said tape member comprises a tongue portion extending over the edge between said outer surface area and said first end face of said first or second jacket member, the surface of said tongue portion facing said outer surface area of said first or second jacket member being provided with a self-adhesive layer.

9. The reinforced insulation jacket for a pipe according to claim 1 in which said tape member comprises a closed cellular structure.

10. The reinforced insulation jacket for a pipe according to claim 1 in which said elastic coating layer comprises a closed cellular structure.

11. The reinforced insulation jacket for a pipe according to claim 1 in which said elastic coating layer comprises vibration damping properties and has an elastic behavior when subjected to compression stress.

12. The reinforced insulation jacket for a pipe according to claim 1 in which said outer surface areas of said first jacket member and second jacket member covered by said tape member are provided with a smooth surface.

13. The reinforced insulation jacket for a pipe according to claim 1 in which said outer surface areas of said first jacket member and second jacket member covered by said tape member comprise a non-foamed surface layer.

14. The reinforced insulation jacket for a pipe according to claim 1 in which each of said first jacket member and said second jacket member includes a reinforcement member.

15. A reinforced insulation jacket for a pipe, comprising:
a first jacket member including a dimensionally stable, thermally insulating material having the shape of a semi hollow cylinder with a first radially extending end face, a second radially extending end face, an inner surface area and an outer surface area;
a second jacket member including a dimensionally stable, thermally insulating material having the shape of a semi hollow cylinder with a first radially extending end face, a second radially extending end face, an inner surface area and an outer surface area;
both said first and second jacket member having substantially identical cross sectional shape and adapted to be joined to form a hollow cylinder thereby enclosing a pipe to be insulated, whereby said first end face of said first jacket member faces said first end face of said second jacket member, and whereby said second end face of said first jacket member faces said second end face of said second jacket member;
a reinforcement member positioned within dimensionally stable, thermally insulating material of at least one of said first jacket member and said second jacket member, said reinforcement member including a rod component and two end cap pieces, said rod component and said two end cap pieces including plastic;
said inner surface area of said first jacket member and said inner surface area of said second jacket member being provided with an elastic coating layer, said elastic coating on said inner surfaces of said first and second jacket member engaging the pipe to be insulated;
at least one of said first end face of said first jacket member and said first end face of said second jacket member, and at least one of said second end face of said first jacket member and said second end face of said second jacket member being provided with an elastic coating layer; and
a tape member common to said first and second jacket member and covering both said outer surface area of said first jacket member and said outer surface area of said second jacket member, said tape member linking said first and second jacket member together at the side of said second end faces of said first and second jacket member such that they can be spread apart from each other at the side of said first end faces of said first and second jacket member to such an extent that the reinforced insulation jacket for a pipe can be radially moved onto the pipe to be insulated, said tape member including a tongue portion extending over the edge between said outer surface area and said first end face of said first or second jacket member, the surface of said tongue portion facing said outer surface area of said first or second jacket member being provided with a self-adhesive layer;
said tape member and said elastic coating layer comprising a closed cellular structure.

16. The reinforced insulation jacket for a pipe according to claim 15 in which said first jacket member includes a reinforcement member and said second jacket member includes a reinforcement member.

17. A reinforced insulation jacket for a pipe, comprising:
a first jacket member including a dimensionally stable, thermally insulating material having the shape of a semi hollow cylinder with a first radially extending end face, a second radially extending end face, an inner surface area and an outer surface area;
a second jacket member including a dimensionally stable, thermally insulating material having the shape of a semi hollow cylinder with a first radially extending end face, a second radially extending end face, an inner surface area and an outer surface area;
both said first and second jacket member having substantially identical cross sectional shape and adapted to be joined to form a hollow cylinder thereby enclosing a pipe to be insulated, whereby said first end face of said first jacket member faces said first end face of said second jacket member, and whereby said second end face of said first jacket member faces said second end face of said second jacket member;
a reinforcement member positioned within the dimensionally stable, thermally insulating material of at least one of said first jacket member and said second jacket member, said reinforcement member including a rigid rod component and two end cap pieces;
said inner surface area of said first jacket member and said inner surface area of said second jacket member being provided with an elastic coating layer, said elastic coating on said inner surfaces of said first and second jacket member engaging the pipe to be insulated;

a latex coating layer coating said first jacket member and said second jacket member, said latex coating layer being between said dimensionally stable, thermally insulating material and said elastic coating layer;

at least one of said first end face of said first jacket member and said first end face of said second jacket member, and at least one of said second end face of said first jacket member and said second end face of said second jacket member being provided with an elastic coating layer; and a tape member common to said first and second jacket member and covering both said outer surface area of said first jacket member and said outer surface area of said second jacket member, said tape member linking said first and second jacket member together at the side of said second end faces of said first and second jacket member such that they can be spread apart from each other at the side of said first end faces of said first and second jacket member to such an extent that the reinforced insulation jacket for a pipe can be radially moved onto the pipe to be insulated.

\* \* \* \* \*